(12) United States Patent
Kim et al.

(10) Patent No.: US 10,446,813 B2
(45) Date of Patent: Oct. 15, 2019

(54) BATTERY MODULE, AND BATTERY PACK AND VEHICLE INCLUDING THE SAME

(71) Applicant: LG CHEM, LTD., Seoul (KR)

(72) Inventors: Bong-Gun Kim, Daejeon (KR); Jun Park, Daejeon (KR); Min-Woo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/136,571

(22) Filed: Sep. 20, 2018

(65) Prior Publication Data

US 2019/0097192 A1 Mar. 28, 2019

(30) Foreign Application Priority Data

Sep. 27, 2017 (KR) .................. 10-2017-0125276

(51) Int. Cl.
*H01M 2/10* (2006.01)
*H01M 2/12* (2006.01)
*H01M 2/04* (2006.01)

(52) U.S. Cl.
CPC ......... *H01M 2/1077* (2013.01); *H01M 2/043* (2013.01); *H01M 2/1094* (2013.01); *H01M 2/127* (2013.01); *H01M 2/1252* (2013.01); *H01M 2/1264* (2013.01); *H01M 2200/00* (2013.01); *H01M 2220/20* (2013.01)

(58) Field of Classification Search
None
See application file for complete search history.

(56) References Cited

U.S. PATENT DOCUMENTS

| | | |
|---|---|---|
| 2007/0196728 A1 | 8/2007 | Yang |
| 2009/0226803 A1 | 9/2009 | Nishino et al. |
| 2010/0099013 A1* | 4/2010 | Holung ............... H01M 2/12 429/50 |
| 2010/0178552 A1 | 7/2010 | Kim et al. |
| 2012/0164490 A1 | 6/2012 | Itoi et al. |
| 2016/0329608 A1 | 11/2016 | Jung et al. |
| 2018/0108892 A1 | 4/2018 | Kim et al. |
| 2019/0088914 A1 | 3/2019 | Choi et al. |

FOREIGN PATENT DOCUMENTS

| | | | | |
|---|---|---|---|---|
| JP | 2004172099 A | * | 6/2004 | ............ H01M 2/12 |
| JP | 2009-211909 A | | 9/2009 | |
| JP | 2011-065906 A | | 3/2011 | |
| JP | 2012079510 | * | 4/2012 | ............ H01M 2/10 |
| KR | 10-2007-0025389 A | | 3/2007 | |

(Continued)

OTHER PUBLICATIONS

JP2012079510 Machine Translation; Osahiro et al., Battery Module and Battery Pack, Apr. 19, 2012.*

*Primary Examiner* — Rena Dye Cronin
(74) *Attorney, Agent, or Firm* — Morgan, Lewis & Bockius LLP

(57) ABSTRACT

Disclosed is a battery module, which includes a plurality of battery cells, a case frame configured to accommodate the plurality of battery cells, and a case cover mounted to a front side and a rear side of the case frame to package the plurality of battery cells together with the case frame, the case cover having an anti-exposure channel provided therein to prevent a flame generated when the battery cells are ignited from being exposed to the outside.

14 Claims, 6 Drawing Sheets

(56) References Cited

FOREIGN PATENT DOCUMENTS

| KR | 10-2008-0041447 | A |   | 5/2008 |              |
|----|-----------------|---|---|--------|--------------|
| KR | 20130027802     | A | * | 3/2013 | ..... H01M 2/12 |
| KR | 10-2015-0089464 | A |   | 8/2015 |              |
| KR | 10-2015-0095158 | A |   | 8/2015 |              |
| KR | 10-1552483      | B1|   | 9/2015 |              |
| KR | 10-2017-0044473 | A |   | 4/2017 |              |
| KR | 20170044473     | A | * | 4/2017 | ..... H01M 2/1077 |
| KR | 20170047687     | A | * | 5/2017 | ..... H01M 2/043 |
| KR | 20170090261     | A | * | 8/2017 | ..... H01M 2/10 |
| KR | 10-2017-0090261 |   | * | 8/2018 | ..... H01M 2/1083 |

* cited by examiner

BATTERY MODULE, AND BATTERY PACK AND VEHICLE INCLUDING THE SAME

TECHNICAL FIELD

The present disclosure relates to a battery module, and a battery pack and a vehicle including the same.

The present application claims priority to Korean Patent Application No. 10-2017-0125276 filed on Sep. 27, 2017 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, the battery cells configuring the battery module or the battery pack are generally pouch-type secondary batteries that may be easily stacked on one another.

In the conventional battery module, the battery cell may be ignited inside the case due to overcharging or the like. When the ignition occurs, if a flame generated from the battery cell is exposed to the outside of the case, it may lead to a larger secondary damage. Meanwhile, if the gas generated during ignition does not escape from the case, the pressure inside the case may rise, which may lead to explosion of the battery module.

Thus, when the battery cell is ignited due to overcharging, it is demanded to find a way to prevent the flame from being exposed to the outside of the case and also to easily discharge the gas out of the case.

DISCLOSURE

Technical Problem

Therefore, the present disclosure is directed to providing a battery module capable of preventing a flame from being exposed to the outside when battery cells are ignited, and a battery pack and a vehicle including the same.

The present disclosure is also directed to providing a battery module capable of easily discharging gas when battery cells are ignited, and a battery pack and a vehicle including the same.

Technical Solution

In one aspect of the present disclosure, there is provided a battery module, comprising: a plurality of battery cells; a case frame configured to accommodate the plurality of battery cells; and a case cover mounted to a front side and a rear side of the case frame to package the plurality of battery cells together with the case frame, the case cover having an anti-exposure channel provided therein to prevent a flame generated when the battery cells are ignited from being exposed to the outside.

The case cover may include a cover frame coupled to the case frame; and the anti-exposure channel provided in the cover frame to communicate with the case frame.

The anti-exposure channel may be formed by a plurality of guide barriers mounted in the cover frame.

The plurality of guide barriers may be arranged to be spaced a predetermined distance from each other along a front and rear direction of the cover frame.

The plurality of guide barriers may have guide openings formed along the front and rear direction of the cover frame.

The guide openings of the plurality of guide barriers may be arranged in a zigzag pattern along the front and rear direction of the cover frame.

The case cover may have a cover outlet formed at one surface of the cover frame to discharge gas generated when the battery cells are ignited.

The case cover may include a mesh member provided in the cover frame and disposed between the cover outlet and the plurality of guide barriers.

The case cover may include a flame-retardant member provided in the cover frame and disposed between the plurality of guide barriers.

In another aspect of the present disclosure, there is also provided a battery pack, comprising at least one battery module according to the above embodiments; and a pack case configured to package the at least one battery module.

In another aspect of the present disclosure, there is also provided a vehicle, comprising at least one battery pack according to the above embodiments.

Advantageous Effects

According to various embodiments as above, the present disclosure provides a battery module capable of preventing a flame from being exposed to the outside when battery cells are ignited, and a battery pack and a vehicle including the same.

Also, according to various embodiments as above, the present disclosure provides a battery module capable of easily discharging gas when battery cells are ignited, and a battery pack and a vehicle including the same.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
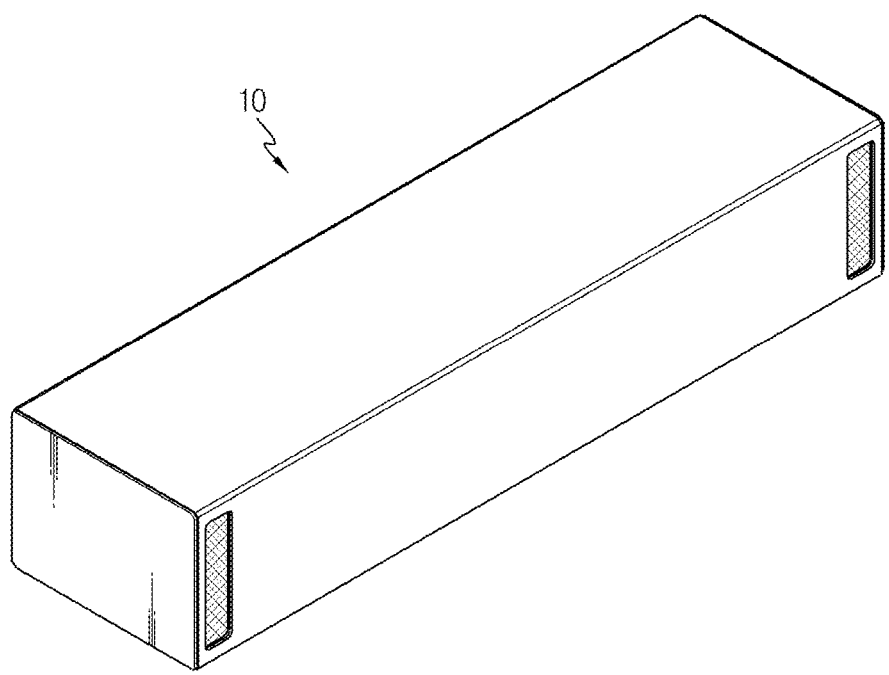
FIG. 1 is a diagram for illustrating a battery module according to an embodiment of the present disclosure.
Figure 2:
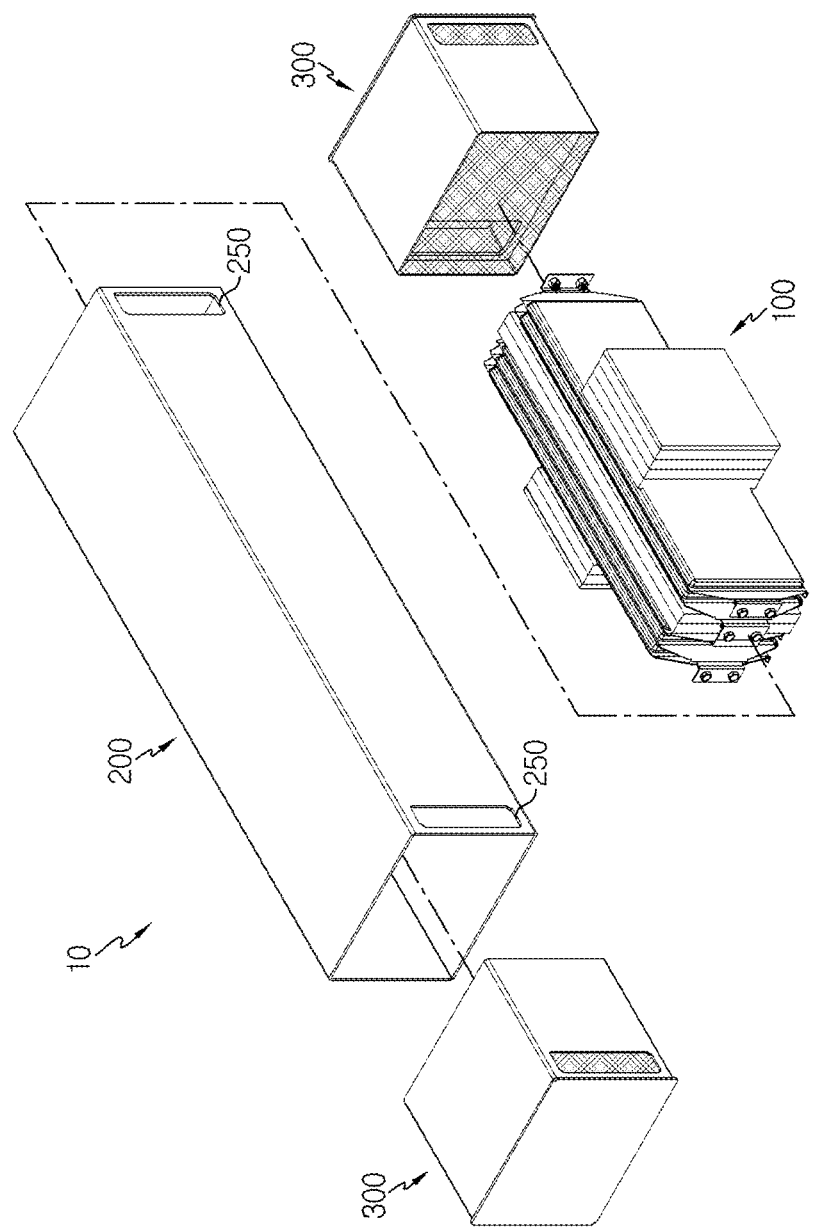
FIG. 2 is an exploded perspective view showing the battery module of FIG. 1.
Figure 3:
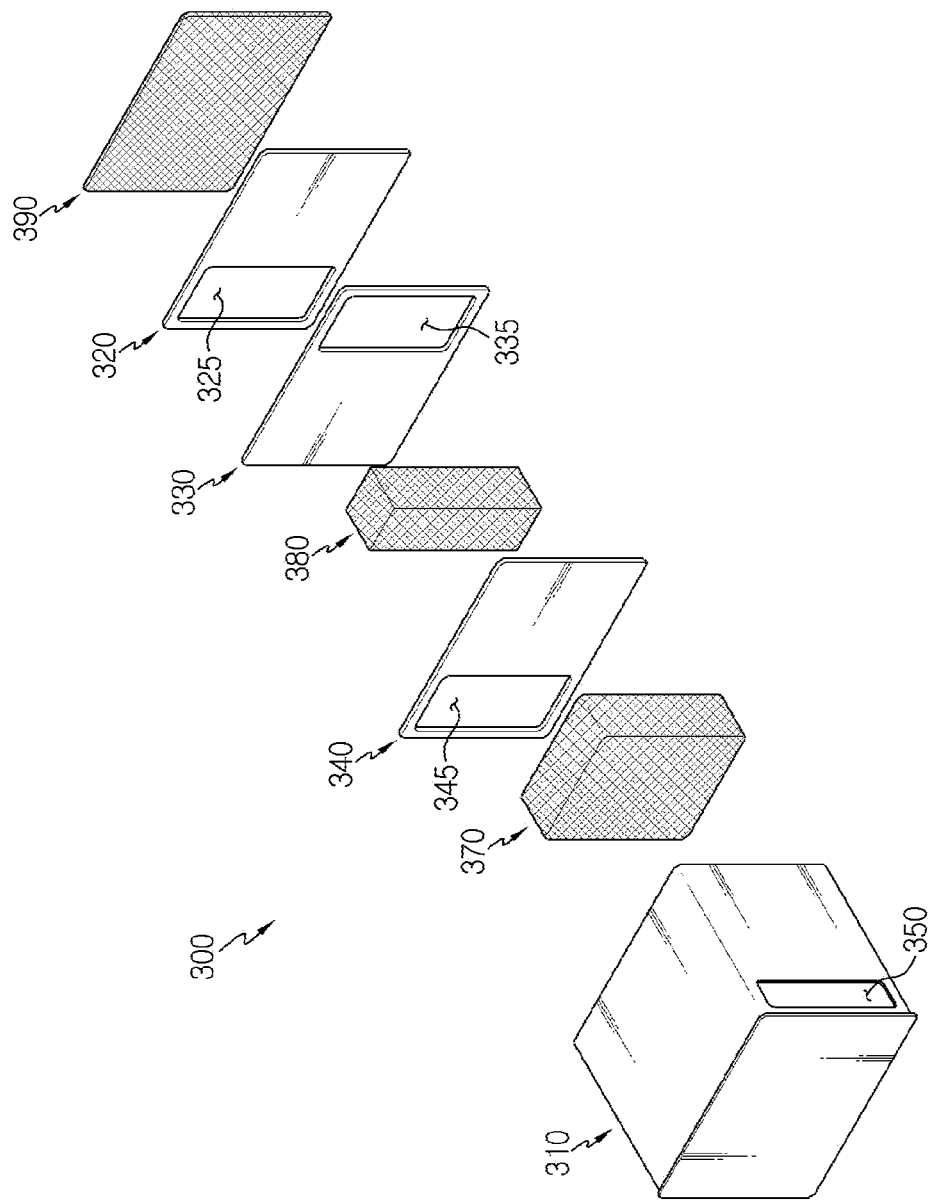
FIG. 3 is an exploded perspective view showing a case cover of FIG. 2.
Figure 4:
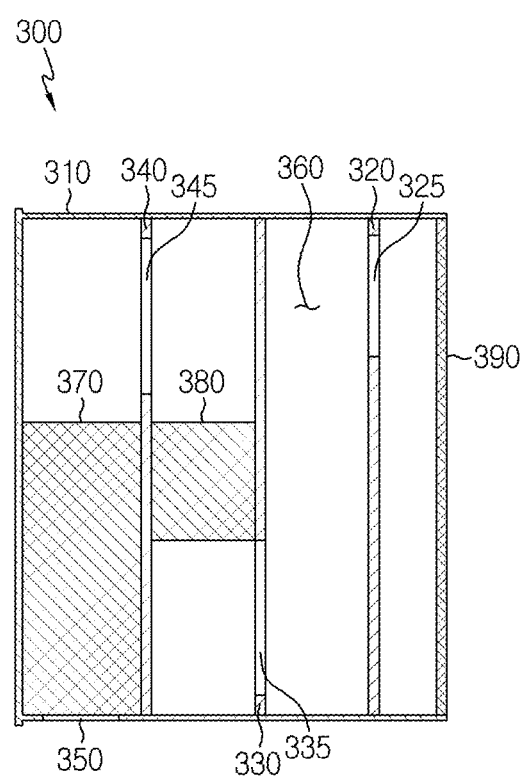
FIG. 4 is a cross-sectioned view showing the case cover of FIG. 3.

FIG. 1 is a diagram for illustrating a battery module according to an embodiment of the present disclosure, FIG. 2 is an exploded perspective view showing the battery module of FIG. 1, FIG. 3 is an exploded perspective view showing a case cover of FIG. 2, and FIG. 4 is a cross-sectioned view showing the case cover of FIG. 3.

Referring to FIGS. 1 to 4, a battery module 10 may include a battery cell 100, a case frame 200 and a case cover 300.

The battery cell 100 is a secondary battery and may be provided as at least one of a pouch-type secondary battery, a rectangular secondary battery and a cylindrical secondary battery. Hereinafter, in this embodiment, the battery cell 100 will be described as a lithium ion battery and as a pouch-type secondary battery.

The battery cell 100 may be provided in plural. The plurality of battery cells 100 may be stacked on one another so as to be electrically connected to each other. Flame-retardant materials may be provided at both outermost sides of the plurality of battery cells 100 to prevent flame discharge.

The case frame 200 may accommodate the plurality of battery cells 100. For this, the case frame 200 may have an accommodation space capable of accommodating the plurality of battery cells 100.

The case frame 200 may have a case outlet 250 for discharging gas generated when the battery cells 100 are ignited. The case outlet 250 may be provided at both ends of the case frame 200 along a longitudinal direction, respectively.

The case cover 300 may be provided in a pair, and the pair of case covers 300 may be mounted at a front side and a rear side of the case frame 200. The case cover 300 may package the plurality of battery cells 100 together with the case frame 200.

The case cover 300 may include a cover frame 310, guide barriers 320, 330, 340, a cover outlet 350, an anti-exposure channel 360, a mesh member 370, a flame-retardant member 380 and a pre-filter 390.

The cover frame 310 forms the appearance of the case cover 300 and may be coupled to the case frame 200. In this embodiment, the cover frame 310 may be slidably mounted to the case frame 200 along a front and rear direction of the case frame 200.

The guide barriers 320, 330, 340 may be provided in plural. The plurality of guide barriers 320, 330, 340 may be disposed to be spaced a predetermined distance from each other inside the cover frame 310 along the front and rear direction of the cover frame 310.

The plurality of guide barriers 320, 330, 340 may include a first guide barrier 320, a second guide barrier 330 and a third guide barrier 340.

The first guide barrier 320 may be disposed closer to both ends of the battery cells 100, compared to the second and third guide barriers 330, 340, inside the cover frame 310.

The first guide barrier 320 may have a guide opening 325.

The guide opening 325 is for allowing gas to pass when the gas is generated from the battery cells 100, and may be formed along the front and rear direction of the first guide barrier 320.

This guide opening 325 may be provided at one side of the first guide barrier 320, in this embodiment, at a left side of the first guide barrier 320 in the front and rear direction.

The second guide barrier 330 is disposed to be spaced a predetermined distance from the first guide barrier 320 and may be disposed between the first guide barrier 320 and the third guide barrier 340, explained later.

The second guide barrier 330 may have a guide opening 335, similar to the first guide barrier 320.

The guide opening 335 is for allowing gas to pass when the gas is generated from the battery cells 100, similar to the guide opening 325 of the first guide barrier 320, and may be formed along the front and rear direction of the second guide barrier 330.

Here, the guide opening 335 may be provided at one side of the second guide barrier 330, in this embodiment, at a right side of the second guide barrier 330 in the front and rear direction.

Accordingly, the guide opening 335 may be provided at a side opposite to the guide opening 325 of the first guide barrier 320 in the front and rear direction of the case cover 300. In other words, the guide opening 335 may be disposed not to face the guide opening 325 of the first guide barrier 320 in the front and rear direction.

The third guide barrier 340 is disposed to be spaced a predetermined distance from the second guide barrier 330 in the front and rear direction of the cover frame 310 and may be disposed closer to the cover outlet 350 of the case cover 300, explained later, compared to the first and second guide barriers 320, 330, inside the cover frame 310.

The third guide barrier 340 may have a guide opening 345, similar to the first and second guide barriers 320, 330.

The guide opening 345 is for allowing gas to pass when the gas is generated from the battery cells 100, similar to the guide openings 325, 335 of the first and second guide barriers 320, 330, and may be formed along the front and rear direction of the third guide barrier 340.

Here, the guide opening 345 may be provided at one side of the third guide barrier 340, in this embodiment, at a left side of the third guide barrier 340 in the front and rear direction.

Accordingly, the guide opening 345 may be provided at a side opposite to the guide opening 335 of the second guide barrier 330 in the front and rear direction of the case cover 300. In other words, the guide opening 345 may be disposed not to face the guide opening 335 of the second guide barrier 330 in the front and rear direction.

Moreover, the guide opening 345 may be provided at the same side as the guide opening 325 of the first guide barrier 320 in the front and rear direction of the case cover 300. As a result, the first to third guide openings 325, 335, 345, namely the guide openings 325, 335, 345 of the plurality of guide barriers 320, 330, 340, may be disposed in a zigzag pattern along the front and rear direction of the cover frame 310.

The cover outlet 350 is formed at one surface of the cover frame 310, and may allow the gas generated during the ignition of the battery cells 100 to be discharged out of the battery module 10.

The cover outlet 350 may be disposed to face the case outlet 250 of the case frame 200 when the case cover 300 is coupled to the case frame 200.

The anti-exposure channel 360 is formed inside the cover frame 310 and may be formed by the plurality of guide barriers 320, 330, 340, namely the first to third guide barriers 320, 330, 340, inside the cover frame 310.

The anti-exposure channel 360 communicates with the case outlet 250 of the case frame 200 to prevent the flame generated during the ignition of the battery cells 100 from being exposed and also to smoothly guide the gas generated during the ignition of the battery cells 100 toward the cover outlet 350.

The anti-exposure channel 360 may ensure a longer path inside the cover frame 310 by means of the guide openings 325, 335, 345 of the first to third guide barriers 320, 330, 340 disposed in the zigzag pattern. Accordingly, in this embodiment, it is possible to more effectively prevent the flame from being exposed out of the battery module 10.

The mesh member 370 is provided inside the cover frame 310 and may be disposed between the cover outlet 350 and the plurality of guide barriers 320, 330, 340. Specifically, the mesh member 370 is provided between the cover outlet 350 and the third guide barrier 340 and may be disposed to face the cover outlet 350.

The flame-retardant member 380 is provided inside the cover frame 310 and may be disposed between the plurality of guide barriers 320, 330, 340. Specifically, the flame-retardant member 380 may be disposed between the second guide barrier 330 and the third guide barrier 340.

The pre-filter 390 is provided inside the cover frame 310 and may be disposed between the plurality of guide barriers 320, 330, 340 and the battery cells 100. Specifically, the pre-filter 390 may be disposed between the battery cells 100 and the first guide barrier 320.

Hereinafter, a flame anti-exposure and gas discharge path of the battery module 10 according to this embodiment will be described in more detail.

Figure 5:
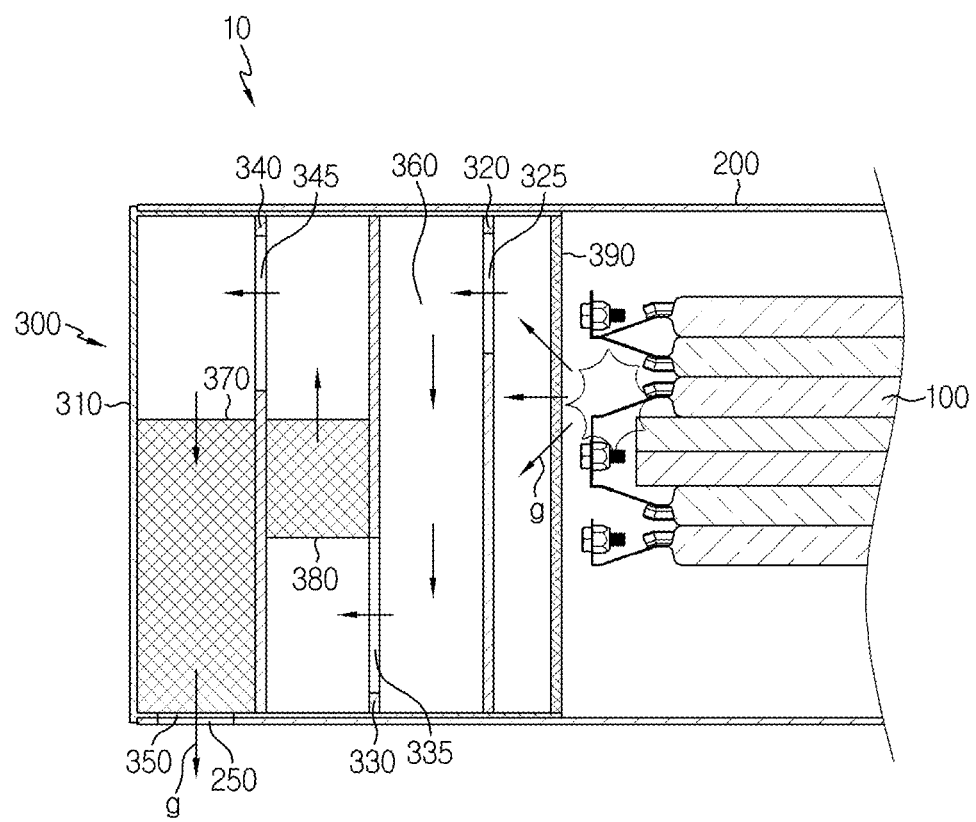
FIG. 5 is a diagram for illustrating a flame anti-exposure and gas discharge path of the battery module of FIG. 1.

FIG. 5 is a diagram for illustrating a flame anti-exposure and gas discharge path of the battery module of FIG. 1.

Referring to FIG. 5, the battery cells 100 may be ignited when the battery module 10 is overcharged. First, the pre-filter 390 disposed near the battery cells 100 may prevent a large flame or a dust or fragment larger than a predetermined size, which may be generated at the ignition point during the ignition, from penetrating into the anti-exposure channel 360. The pre-filter 390 may guide a gas g generated from the battery cells 100 toward the anti-exposure channel 360 preferentially.

The gas g passed through the pre-filter 390 may then be smoothly discharged out of the battery module 10 while moving through the anti-exposure channel 360 in the cover frame 310.

Hereinafter, a discharging path of the gas g through the anti-exposure channel 360 will be described in more detail.

After passing through the pre-filter 390, the gas g may pass through the guide opening 325 of the first guide barrier 320 and then pass through the guide opening 335 of the second guide barrier 330, provided at a side opposite to the guide opening 325 of the first guide barrier 320.

After that, the gas g may pass through the flame-retardant member 380 and then pass through the guide opening 345 of the third guide barrier 340, provided at a side opposite to the guide opening 335 of the second guide barrier 330.

In addition, after passing through the mesh member 370, the gas g may pass through the cover outlet 350, provided at a side opposite to the guide opening 345 of the third guide barrier 340.

Finally, the gas g that has passed through the anti-exposure channel 360 may be discharged out of the battery module 10 while passing through the case outlet 250 of the case frame 200.

Meanwhile, the flames, dust and fragments may partially enter the cover frame 310 through the pre-filter 390. However, in this embodiment, since the anti-exposure channel 360 is formed in a zigzag pattern inside the cover frame 310 and thus has a longer path inside the case cover 300, it is possible to effectively prevent the flame or align substances from being exposed out of the case frame 200.

Moreover, the first to third guide barriers 320, 330, 340 in the cover frame 310 may serve as a shield to prevent some of the flame, dust and fragments from moving.

In addition, some of the flame, dust and fragments may be additionally filtered through the flame-retardant member 380 inside the anti-exposure channel 360 and be finally filtered through the mesh member 370.

Accordingly, in this embodiment, it is possible to effectively prevent the flame, dust and fragments generated during the ignition of the battery cells 100 from being exposed out of the battery module 10.

Figure 6:
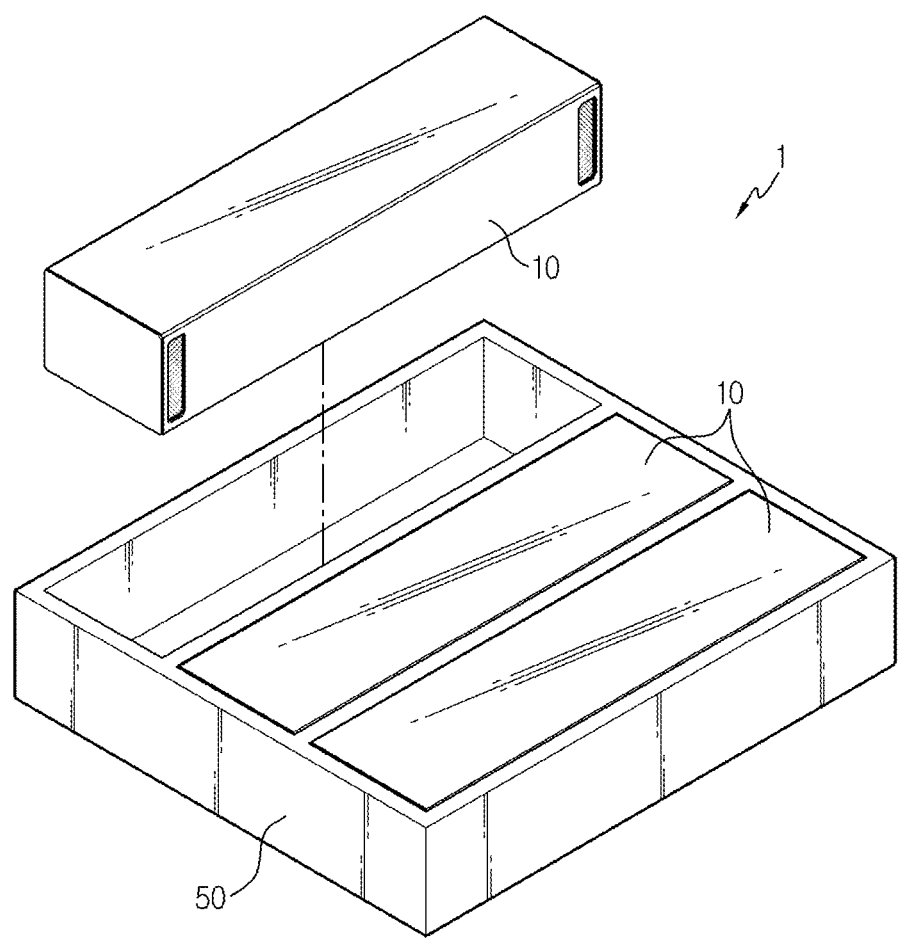
FIG. 6 is a diagram for illustrating a battery pack according to an embodiment of the present disclosure.

FIG. 6 is a diagram for illustrating a battery pack according to an embodiment of the present disclosure.

Referring to FIG. 6, a battery pack 1 may include at least one battery module 10 according to the former embodiment and a pack case 50 for packaging the at least one battery module 10.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

According to various embodiments as above, it is possible to provide the battery module 10 capable of preventing a flame from being exposed to the outside when battery cells 100 are ignited, and a battery pack 1 and a vehicle including the same.

Also, according to various embodiments as above, it is possible to provide the battery module 10 capable of easily discharging gas when battery cells 100 are ignited, and a battery pack 1 and a vehicle including the same.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

| Reference Signs | |
| --- | --- |
| 1: battery pack | 10: battery module |
| 50: pack case | 100: battery cell |
| 200: case frame | 250: case outlet |
| 300: case cover | 310: cover frame |
| 320: first guide barrier | 325: guide opening |
| 330: second guide barrier | 335: guide opening |
| 340: third guide barrier | 345: guide opening |
| 350: cover outlet | 360: anti-exposure channel |
| 370: mesh member | 380: flame-retardant member |
| 390: pre-filter | |

What is claimed is:

1. A battery module, comprising:
a plurality of battery cells;
a case frame configured to accommodate the plurality of battery cells, at least one side of the case frame defining an open side; and
a case cover configured to be inserted into the at least one side of the case frame to package the plurality of battery cells together with the case frame, the case cover defining an anti-exposure channel therein to prevent a flame generated from the battery cells from being exposed to the outside,
wherein the case cover has a box shape, and wherein the anti-exposure channel is disposed inside the case frame when the case cover is inserted into the case frame.

2. The battery module according to claim 1,
wherein the case cover includes:
a cover frame coupled to the case frame; and
the anti-exposure channel provided in the cover frame to communicate with the case frame.

3. The battery module according to claim 2,
wherein the anti-exposure channel is formed by a plurality of guide barriers mounted in the cover frame.

4. The battery module according to claim 3,
wherein the plurality of guide barriers are arranged to be spaced a predetermined distance from each other along a front and rear direction of the cover frame.

5. The battery module according to claim 3,
wherein the plurality of guide barriers have guide openings formed along the front and rear direction of the cover frame.

6. The battery module according to claim 5,
wherein the guide openings of the plurality of guide barriers are arranged in a zigzag pattern along the front and rear direction of the cover frame.

7. The battery module according to claim 3,
wherein the case cover has a cover outlet formed at one surface of the cover frame to discharge gas generated when the battery cells are ignited.

8. The battery module according to claim 7,
wherein the case cover includes a mesh member provided in the cover frame and disposed between the cover outlet and the plurality of guide barriers.

9. The battery module according to claim 3,
wherein the case cover includes a flame-retardant member provided in the cover frame and disposed between the plurality of guide barriers.

10. A battery pack, comprising:
at least one battery module as defined in claim 1; and
a pack case configured to package the at least one battery module.

11. A vehicle, comprising:
at least one battery pack as defined in claim 10.

12. The battery module according to claim 1,
wherein the at least one side of the case frame includes a front side and a rear side each defining an open side, and
wherein the case cover includes a front case cover and a rear case cover respectively inserted the front and rear sides of the case frame.

13. The battery module according to claim 1,
wherein the case cover has a cover outlet at one surface of the cover frame, and the case frame has a case outlet at another side of the case frame adjacent to the at least one side of the case frame such that the case outlet and the cover outlet are aligned when the case cover is inserted into the case frame to discharge gas generated from the battery cells.

14. The battery module according to claim 1,
wherein the case cover has a rectangular box shaped structure inserted into the open side.

* * * * *